3,374,178
DOPED HYPOSTOICHIOMETRIC DIOXIDE NUCLEAR FUEL COMPOSITION AND METHOD OF PREPARATION
John Edward May, Wantage, England, and Richard Lloyd Stoute, Deep River, Ontario, Canada, assignors to Atomic Energy of Canada Limited, Ottawa, Ontario, Canada, a corporation of Canada
No Drawing. Filed May 3, 1965, Ser. No. 452,895
7 Claims. (Cl. 252—301.1)

This invention deals with ceramic type fuel for nuclear reactors. More particularly, the present invention relates to nuclear fuel compositions selected from the group consisting of uranium dioxide and thorium dioxide and mixtures thereof, having improved thermal conductivity, through incorporation therein of minor quantities of an oxide of yttrium, lanthanum or niobium, the dioxide being in a hypostoichiometric state.

As is well known in the art a good thermal conductivity is a most important requirement for nuclear fuel elements. Considerable efforts have been expended to improve conductivity in ceramic type fuel elements. For example, additives which increase the post sintered density and therefore the heat conductivity have been used as well as other additives which simply possess good heat conductivity. It has now been found that properly doped uranium dioxide or thorium dioxide base fuel bodies in a hypostoichiometric state exhibit improved thermal conductivity over undoped hyper- or hypostoichiometric dioxide. The improvement appears attributable to a lattice defect structure.

The doping ingredients are oxides of elements selected from the group consisting of yttrium, lanthanum and niobium. Effective doping ranges are from 0.1 atom percent to 1 atom percent. (In this context, the term "atom percent" describes a doping addition as a percentage of the total metal atoms in a particular composition. For the additives specified, "atom percent" values effectively correspond to twice the mole percent of added oxide.) Higher doping concentrations, as for example 2 to 4 atom percent of niobium, have been found to be detrimental, apparently because a resulting loss in lattice conductivity suppressed any improvement due to the effect of the additive. Doping with $TiO_2$ or $ZrO_2$ does not improve the thermal conductivity, and test data indicate that Ti or Zr may in fact lower the thermal conductivity of hypostoichiometric $UO_2$.

Mention has already been made of the hypostoichiometric character of the uranium dioxide or thorium dioxide; the improvements in thermal conductivity appears to require an O/metal ratio of less than 2, the actual ratio ranging about 1.90–1.998. Test data indicate that doping stoichiometric oxides (O/metal=2) fails to improve thermal conductivity.

Thus the present invention may be characterized more specifically as a ceramic fuel composition of a base selected from the group consisting of uranium and thorium dioxides and mixtures thereof containing from 0.1–1.0 atom percent of an oxide of an element selected from the group consisting of yttrium, lanthanum and niobium, and wherein the dioxide is in a hypostoichiometric state with an oxygen to metal ratio ranging about 1.90–1.998 and preferably 1.97–1.998. Thus within the contemplation of the present invention and the above characterization thereof are mixtures of uranium and thorium dioxides, or even the presence of minor amounts of plutonium oxide in the uranium dioxide or thorium dioxide. Particularly contemplated for example is a composition containing 97.5% $UO_2$–2.3% $PuO_2$, the balance in this exemplary composition being 0.3% $Y_2O_3$.

The present fuel composition is formed by suitably securing an intimate mixture of additive and base, the dioxide base being stoichiometric or hyperstoichiometric, e.g., O/U=2.05. The mixture is then converted into a fuel element by conventional techniques such as sintering in a hydrogen atmosphere at about 1600° C. Thereafter the dioxide is partially reduced to achieve the hypostoichiometric state by heating to about 1700° C.–2000° C. under suitably deoxygenating conditions. Such conditions are conveniently realized by presence of a suitable getter (e.g., uranium metal, thorium metal, tantalum, graphite) or by heating to 1700° C.–2000° C. in a deoxygenating atmosphere, such as argon. For further details on formation of the hypostoichiometric state, including in situ formation thereof directly in the reactor, reference is made to copending application Ser. No. 419,226.

As a practical matter the present products can be prepared by intimately admixing powdered uranium or thorium dioxide (stoichiometric or hyperstoichiometric) with powdered additive oxide or free metal. Advantageously, the additive could be added at an earlier stage in the fabrication, as for example to the liquid prior to precipitation of ammonium diuranate during the course of preparation of ceramic grade $UO_2$ powder.

For further understanding of the present invention the following specific examples thereof are presented.

EXAMPLE 1

Ceramic grade $UO_2$ powder and high purity $Y_2O_3$ powder were sieved through −325 mesh screens. Then 300 grams of the $UO_2$ powder and 0.251 gram of $Y_2O_3$ powder were dry blended to prepare a $UO_2$-0.1 mole percent $Y_2O_3$ mixture. No binder or other pressing or sintering aids were added. After 10 minutes blending the powder was pressed into 50 gram pellets. These pellets were sintered in a furnace with a hydrogen atmosphere; the heating and cooling rates were 200° C./hour with a one-hour hold at a maximum temperature of 1650° C.

A number of rod-shaped specimens, 3.5 mm. diameter x 12 mm. long, were cut from one of these pellets. Several of these specimens were partially reduced by heating at 2000° C. for three hours in contact with tantalum metal in a non-oxidizing atmosphere (argon). This treatment produced hypostoichiometric composition as indicated by the presence of metallic inclusions in the microstructure of a cooled specimen.

Control specimens of as-sintered $UO_2$ were prepared in a similar manner from an undoped $UO_2$ pellet (made from the same batch of $UO_2$).

The first thermal conductivity comparison was between as-sintered $UO_2$-0.1 mole percent $Y_2O_3$ and an as-sintered $UO_2$ control. The specimens were mounted at equivalent positions on a graphite heater so that one end of each rod was maintained at the same elevated temperature. The surrounding space was evacuated so the rods lost the heat gained from the graphite by radiation only. Comparison of their optical emissions showed that the doped specimen had the lower thermal conductivity.

The second comparison was between partially reduced $UO_2$-0.1 mole percent $Y_2O_3$ and another as-sintered $UO_2$ control. Fine thermocouples were placed in small holes drilled in the free ends of the rods. Comparison both of their optical emissions and of the measured rod end temperatures (as measured by the thermocouples) showed that the treated specimen had a significantly higher conductivity than the $UO_2$ control specimen. Comparison of the doped specimen with a hypostoichiometric pure $UO_2$ specimen showed that the doped specimen exhibited higher thermal conductivity at lower temperature levels (i.e., 400° C.–1200° C.), and about the same conductivity at high temperature levels (e.g., above 1200° C.). For reactor purposes, therefore, the doped material is qualitatively somewhat superior to pure hypostoichiometric $UO_2$.

In a third experiment the thermal conductivity of partially reduced $UO_2$-0.175 mole percent $Y_2O_3$ was compared with that of as-sintered $UO_2$. The doped specimen exhibited an improvement in conductivity larger than had been observed with the partially reduced $UO_2$-0.1 mole percent $Y_2O_3$ material.

A fourth experiment was performed to demonstrate that the observed temperature differences represented actual improvements in conductivity and not a change in the emissivities of the specimens' surfaces. A rod of partially reduced $UO_2$-0.1 mole percent $Y_2O_3$ and a rod of as-sintered $UO_2$ were each coated by cathodic sputtering with a thin layer of pure tungsten in order to ensure that both specimens had the same emissivity. A conductivity comparison again confirmed the higher thermal conductivity of the partially reduced doped hypostoichiometric $UO_2$.

EXAMPLE 2

$UO_2$-0.1 mole percent $La_2O_3$

The samples were prepared by the methods given in Example 1 except for the required changes in the nature and weights of the powders. Comparison between this partially reduced $UO_2$-0.1 mole percent $La_2O_3$ and as-sintered $UO_2$ showed that improved thermal conductivity in the doped specimen became manifest at a lower temperature than in the comparable hypostoichiometric pure $UO_2$ specimen. The magnitude of the effect was similar to that obtained by doping with $Y_2O_3$.

EXAMPLE 3

$UO_2$-0.1 mole percent $Nb_2O_5$

The samples were prepared by the methods given in Example 1 except for the required changes in the nature and weights of the powders. A thermal conductivity comparison was made between partially reduced $UO_2$-0.1 mole percent $Nb_2O_5$ and as-sintered $UO_2$. This doped specimen showed a slightly larger conductivity improvement than occurred in the comparable hypostoichiometric pure $UO_2$.

EXAMPLE 4

$ThO_2$ doped with $Y_2O_3$

Pellets of $ThO_2$, $ThO_2$-0.1 mole percent $Y_2O_3$ and $ThO_2$-0.5 mole percent $Y_2O_3$ were prepared by the methods described in Example 1. As before, specimen rods were cut from the pellets and the doped specimens partially reduced by heating in the presence of tantalum at 2000° C. for three hours. Thermal conductivity comparisons against pure $ThO_2$ controls showed markedly improved thermal conductivity in the partially reduced doped specimens. The higher additive proportion caused the thermal conductivity improvement to become available at lower temperatures.

What is claimed is:

1. A ceramic nuclear fuel composition comprising a hypostoichiometric dioxide of a metal selected from the group consisting of uranium and thorium and mixtures thereof with an oxygen to metal ratio in the range of about 1.90–1.998 and containing therein minor quantities of an additive oxide of a metal selected from the group consisting of yttrium, lanthanum and niobium.

2. The composition of claim 1 wherein the additive is present in about the range of 0.1–1 atom percent.

3. The composition of claim 1 wherein the fuel metal includes minor amounts of plutonium dioxide.

4. A ceramic nuclear fuel composition comprising a hypostoichiometric dioxide of a metal selected from the group consisting of uranium and thorium and mixtures thereof with an oxygen to metal ratio below 2.0 and containing therein minor quantities of an additive oxide of a metal member selected from the group consisting of yttrium, lanthanum and niobium.

5. A fuel element for nuclear reactors, the fuel comprising uranium dioxide in which the oxygen to uranium ratio is below 2.0 doped with up to 1 atom percent of an oxide of yttrium.

6. A fuel element for nuclear reactors, the fuel comprising uranium dioxide in which the oxygen to uranium ratio is below 2.0 doped with up to 1 atom percent of an oxide of lanthanum.

7. The procedure for forming reactor fuel compositions comprising: (1) forming an intimate mixture of a hyperstoichiometric dioxide of a metal selected from the group consisting of uranium and thorium and mixtures thereof with up to about 1 atom percent of a member selected from the group consisting of the metal and metal oxides of yttrium, lanthanum and niobium; (2) sintering the mixture; and (3) thereafter reducing the dioxide to a hypostoichiometric state at a temperature in the range of about 1700–2000° C.

References Cited

UNITED STATES PATENTS

| 3,263,004 | 7/1966 | Bean | 252—301.1 XR |
| 3,272,602 | 9/1966 | Suehiro et al. | 23—354 |
| 3,344,081 | 9/1967 | Elyard et al. | 252—301.1 |

CARL D. QUARFORTH, *Primary Examiner.*

BENJAMIN R. PADGETT, *Examiner.*

S. J. LECHERT, JR., *Assistant Examiner.*